United States Patent
Hansen et al.

(10) Patent No.: US 12,129,832 B2
(45) Date of Patent: Oct. 29, 2024

(54) SPAR CAP ASSEMBLY FOR A WIND TURBINE BLADE WITH A LIGHTNING PROTECTION SYSTEM

(71) Applicant: LM WIND POWER A/S, Kolding (DK)

(72) Inventors: Lars Bo Hansen, Kolding (DK); Karsten Schibsbye, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/035,566

(22) PCT Filed: Nov. 15, 2021

(86) PCT No.: PCT/EP2021/081677
§ 371 (c)(1),
(2) Date: May 5, 2023

(87) PCT Pub. No.: WO2022/106351
PCT Pub. Date: May 27, 2022

(65) Prior Publication Data
US 2023/0407848 A1 Dec. 21, 2023

(30) Foreign Application Priority Data
Nov. 20, 2020 (GB) ..................... 2018285

(51) Int. Cl.
*F03D 80/30* (2016.01)
*B29C 70/30* (2006.01)
(Continued)

(52) U.S. Cl.
CPC .............. *F03D 80/30* (2016.05); *B29C 70/30* (2013.01); *B29C 70/885* (2013.01);
(Continued)

(58) Field of Classification Search
CPC ...... F03D 80/30; F03D 1/0682; F03D 1/0675; B29C 70/30; B29C 70/885; B29K 2105/106; B29K 2307/04; B29L 2031/085; F05B 2230/232; F05B 2280/6003; Y02E 10/72
See application file for complete search history.

(56) References Cited

U.S. PATENT DOCUMENTS 8,657,582 B2 * 2/2014 Hibbard .................. F03D 80/30
416/229 R
9,816,482 B2 11/2017 Caruso et al.
2010/0329865 A1 * 12/2010 Hibbard .................. F03D 80/30
174/2

FOREIGN PATENT DOCUMENTS

CN 209195603 U 8/2019
CN 110219784 A 9/2019
(Continued)

*Primary Examiner* — Brandon D Lee
(74) *Attorney, Agent, or Firm* — Nath, Goldberg & Meyer; Tanya E. Harkins (57) ABSTRACT

The present invention relates to a wind turbine blade comprising a lightning protection system with at least one tip end lightning receptor arranged at an outer surface of the blade and a down conductor extending within the blade. The blade comprises carbon fibre reinforced spar caps, wherein electrically conductive meshes are connected between the respective tip end of each spar cap to the tip end lightning conductor.

16 Claims, 5 Drawing Sheets

(51) Int. Cl.
  *B29C 70/88* (2006.01)
  *B29K 105/10* (2006.01)
  *B29K 307/04* (2006.01)
  *B29L 31/08* (2006.01)
  *F03D 1/06* (2006.01)

(52) U.S. Cl.
  CPC ...... *F03D 1/0682* (2023.08); *B29K 2105/106* (2013.01); *B29K 2307/04* (2013.01); *B29L 2031/085* (2013.01); *F05B 2230/232* (2013.01); *F05B 2280/6003* (2013.01)

(56) References Cited

FOREIGN PATENT DOCUMENTS

| | | | |
|---|---|---|---|
| EP | 3670169 | A1 | 6/2020 |
| WO | 2013084370 | A1 | 6/2013 |
| WO | 2018101632 | A1 | 6/2018 |

\* cited by examiner

SPAR CAP ASSEMBLY FOR A WIND TURBINE BLADE WITH A LIGHTNING PROTECTION SYSTEM

This is a National Phase Application filed under 35 U.S.C. 371 as a national stage of PCT/EP2021/081677, filed Nov. 15, 2021, an application claiming the benefit of British Application No. 2018285.3, filed Nov. 20, 2020, the content of each of which is hereby incorporated by reference in its entirety.

FIELD OF THE INVENTION

The present invention relates to a spar cap assembly for a wind turbine blade with a lightning protection system, to a lightning protection system, to a wind turbine blade comprising said spar cap assembly, and to a method of manufacturing the spar cap assembly.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps, which are also called main laminates, are placed or integrated in the shell halves and may be combined with shear webs or spar beams to form structural support for the blade. Spar caps or main laminates may be joined to, or integrated within, the inside of the suction and pressure halves of the shell.

As wind turbines and wind turbine blades increase in size, the risk of lighting striking the wind turbine increases. It is therefore of increasing interest to provide wind turbines and in particular wind turbine blades with lightning protection measures. It is known to provide blades for wind turbines with lightning receptors that are, inside the blade, in electric connection with a down conductor that is able to connect a lightning current to earth. A lightning strike directly into the laminate may cause damage to a blade comprising electrically conductive fibres, as they would conduct the current and thereby would develop a substantial amount of heat. Furthermore, resin bonding fibres together might be a poor conductor, providing for risk of flashover between conductive fibres being held in the resin, which may potentially damage the material.

Thus, it is of increasing importance to provide a lightning protection system and ways of integrating a lightning protection system, which protects components of the wind turbine blade, comprising electrically conductive materials, from being damaged by lightning strikes.

It is therefore an object of the present invention to provide an improved lightning protection system for a wind turbine blade.

It is another object of the present invention to provide a lightning protection system for a wind turbine blade that reduces lightning strike damage to the blade, in particular to the spar cap.

It is another object of the present invention to provide a wind turbine blade with a lightning protection system which can be manufactured more efficiently and cost-effectively.

SUMMARY OF THE INVENTION

It has been found that one or more of the aforementioned objects can be obtained by providing a wind turbine blade having a profiled contour including a pressure side and a suction side, and a leading edge and a trailing edge with a chord having a chord length extending therebetween, the wind turbine blade extending in a spanwise direction between a root end and a tip end, the blade comprising a lightning protection system comprising at least one tip end lightning receptor arranged at an outer surface of the blade and a down conductor extending within the blade, a first carbon fibre reinforced spar cap having a tip end and an opposing root end, the first spar cap being arranged inside the blade along the pressure side, a second carbon fibre reinforced spar cap having a tip end and an opposing root end, the second spar cap being arranged inside the blade along the suction side, a first electrically conductive mesh connecting the tip end of the first spar cap to the tip end lightning receptor, a second electrically conductive mesh connecting the root end of the first spar cap to the down conductor, a third electrically conductive mesh connecting the tip end of the second spar cap to the tip end lightning receptor, and a fourth electrically conductive mesh connecting the root end of the second spar cap to the down conductor.

This arrangement is found to afford a particularly efficient lightning protection of the blade, in particular avoiding substantial damage to the spar cap. Carbon fibres typically are not as good of an electrical conductor as most metals, such as copper, which are used as down conductor in wind turbine blades. This difference in electrical conductivity is advantageously addressed by the present invention, in particular by connecting respective meshes to the opposing ends of the spar cap. Thus, the spar cap assemblies of the present invention can act as down conductors or part thereof, helping to establish a path to the ground connection.

Usually, the blade comprises a shell body with two shell halves, i.e. a pressure side shell half and a suction side shell half. The shell body is typically made of a composite material and comprises a longitudinal or spanwise direction extending between a root end and a tip end. The shell halves of the wind turbine blade are typically manufactured as fibre composite structures by means of VARTM (vacuum assisted resin transfer moulding), where liquid polymer, also called resin, is filled into the blade mould cavity, in which a fibre lay-up has been inserted together with the spar cap and typically a sandwich core material, and where a vacuum is generated in the mould cavity, hereby drawing in the polymer. The polymer can be thermoset plastic or thermoplastics. Typically, the mould cavity is covered with a resilient vacuum bag. By generating a vacuum, the liquid resin can be drawn in and fill the mould cavity with the fibre material contained herein. In most cases, the resin applied is polyester or epoxy, and typically the fibre lay-up is based on glass fibres and/or carbon fibres. Usually a shear web is arranged in between the first spar cap and the second spar cap. Each shear web may comprise a web body, a first web foot flange at a first end of the web body, and a second web foot flange at a second end of the web body. In some embodiments, the shear webs are substantially I-shaped. Alternatively, the shear webs may be substantially C-shaped.

The tip end lightning receptor is preferably arranged at or in the immediate vicinity of the tip of the blade. The tip end lightning receptor may be located on the outer surface of the blade or it may take the form of a solid metal tip conformal with the shape of the blade with the tip end region. The tip end lightning receptor may also be conformal with the shape of the tip end. In some embodiments, the tip end lightning receptor is implemented as a solid carbon fibre tip. Furthermore, the carbon fibre roving and/or the spar caps may be arranged to span the length between the root end and the tip end of the wind turbine blade, hereby enabling the use of a solid carbon fibre tip.

Typically, the down conductor can comprise a cable made of or comprising an electrically conductive material, such as copper or aluminium, and extending within the shell body to the root end of the blade. The down conductor is preferably connected to earth via the rotor hub so that current from a lightning strike can be safely conducted from the tip end lightning receptor through the spar cap(s) to the down conductor and finally to earth. However, in other embodiments, a spark gap is provided between the down conductor and the rotor hub. The down conductor of the present invention preferably extends between the root end of the blade and the second and fourth electrically conductive mesh. The down conductor and/or the tip end lightning receptor may be electrically insulated at least up to the shell body of the blade and preferably at least partially through the shell body. Thus, the risk for damaging lightning strikes or flashovers at the tip end of the blade is minimised even further.

The tip end lightning receptor preferably is a graphite lightning receptor, arranged on or within the outer surface of the blade within the tip end region of the blade. Each carbon fibre reinforced spar cap comprises carbon fibre, preferably carbon rovings, particularly preferred unidirectional carbon fibre rovings, and preferably a resin or binding agent. In some embodiments, the carbon fibre reinforced spar cap may also comprise a glass fibre material. It is particularly preferred that the spar cap comprises a plurality of layers of carbon fibre rovings, preferably unidirectional carbon fibre rovings. The spar cap of the present invention has a tip end, i.e. an end that is arranged closest to the tip end of the blade, and an opposing root end, i.e. an end that is arranged closest to the root end of the blade. The spar cap usually extends in a substantially spanwise or longitudinal direction between its tip end and its root end.

The first spar cap is arranged inside the blade along the pressure side, i.e. usually as part of or adhered to the pressure side shell half. Likewise, the second carbon fibre reinforced spar cap is arranged inside the blade along the suction side, i.e. usually as part of or adhered to the suction side shell half. Each shell half may comprise one or more additional spar caps. The first and second spar caps extend in a substantially spanwise direction within the blades. In some embodiments, each spar cap has a length or spanwise extent of at least 50 meters.

A first electrically conductive mesh connects the tip end of the first spar cap to the tip end lightning receptor, and a second electrically conductive mesh connects the root end of the first spar cap to the down conductor. Similarly, a third electrically conductive mesh connects the tip end of the second spar cap to the tip end lightning receptor, and a fourth electrically conductive mesh connects the root end of the second spar cap to the down conductor. It is preferred that each mesh extends into its respective spar cap by up to 50% of the total spanwise extent of the mesh. Preferably, each mesh extends into its respective spar cap by being interleaved with the spar cap at the respective end of the spar cap. It is particularly preferred that at least part of the mesh is arranged in between carbon fibre layers of the spar cap. This advantageously provides a good electrical connection and an improved conductivity between the tip end lightning receptor, the meshes, the spar cap and the down conductor. Preferably, the mesh is a metallic mesh.

In a preferred embodiment, the first electrically conductive mesh is spaced apart from the second electrically conductive mesh by a spanwise distance of at least 50%, such as at least 80% of the blade length, and the third electrically conductive mesh is spaced apart from the fourth electrically conductive mesh by a spanwise distance of at least 50%, such as at least 80%, of the blade length. In another preferred embodiment, the first electrically conductive mesh is spaced apart from the second electrically conductive mesh by a spanwise or longitudinal distance of at least 50%, such as at least 80% of the spanwise or longitudinal extent of the first spar cap, and the third electrically conductive mesh is spaced apart from the fourth electrically conductive mesh by a spanwise or longitudinal distance of at least 50%, such as at least 80%, of the spanwise or longitudinal extent of the second spar cap.

In a particularly preferred embodiment, the first spar cap is electrically connected to the second spar cap by at least one conductor, preferably a metal conductor such as a cable comprising a metal conductor, as an equipotential connection between the first and the second spar cap. The equipotential connection can equipotentialize a voltage built up between the first and the second spar cap. Preferably, the first spar cap is electrically connected to the second spar cap by at least one conductor in a midsection of the first and two spar caps, i.e. within a spanwise region extending from the midpoint between the tip end and the root end of each spar cap by at least 20%, such as at least 25% or at least 30%, of the spanwise extent or length of each spar cap into each spanwise direction, i.e. towards the tip end and towards the root end of the spar cap, respectively. In other words, said midsection of the spar cap includes the midpoint and at 20%, such as at least 25% or at least 30%, of the length in either direction, i.e. in total 40%, such as at least 50% or at least 60% of the length.

In a preferred embodiment, the conductor between the first and second spar cap for the equipotential connection extends in a substantially flapwise direction, i.e. substantially vertically or perpendicularly to the spanwise direction. Thus, the conductor between the first and second spar cap for the equipotential connection preferably extends substantially vertically within the blade. In a preferred embodiment, said conductor is connected to the first and second spar cap with respective anchor blocks and bolts, each bolt being received in a respective anchoring block. Thus, a first anchor block is preferably arranged at the inside facing surface of the first spar cap, and a second anchor block is preferably arranged at the inside facing surface of the second spar cap, wherein a first bolt extends from the opposing outside facing surface of the first spar cap through the first spar cap, being received, for example in a threaded connection in the first anchor block. Similarly, a second bolt may extend from the opposing outside facing surface of the second spar cap through the second spar cap, being received, for example in a threaded connection in the second anchor block. The first and second bolts may be electrically connected to the conductor for the equipotential connection. In some embodiment, the first and second bolts are lightning receptor bolts, in that the bolts extend to the outer blade surface. Thus, the bolts may extend through both the shell and the respective spar cap into the anchor block. In one embodiment, a mesh, such as an electrically conductive mesh, may be implemented into each anchor block for enhancing the conductivity between the two spar caps.

In a preferred embodiment, each of the electrically conductive meshes has a proximal end extending into the respective spar cap and a distal end protruding from the respective spar cap. Typically, the respective distal ends of the first and third mesh point towards the tip end of the blade, whereas the respective distal ends of the second and fourth mesh point towards the root end of the blade. In a preferred embodiment, the proximal end of the mesh extends into the respective spar cap by at least 50 mm in the spanwise direction. In other words, the spanwise overlap between a mesh and its spar cap may be at least 25 mm, such as at least 50 mm or at least 100 mm. In some embodiments, the spanwise overlap between a mesh and its spar cap is no longer than meters, such as not longer than 2 meters or not longer than 1 meter.

In a preferred embodiment, the distal end of the mesh protrudes from the respective spar cap by at least 50 mm, such as at least 100 mm or at least 200 mm, in the spanwise direction. In a preferred embodiment, the respective distal ends of the second and the fourth electrically conductive mesh are fastened to a solid metal member, the solid metal member being fastened to the down conductor.

In a preferred embodiment, the respective distal ends of the first and the third electrically conductive mesh are fastened to a respective anchor block, each anchor block being attached to a respective conductor, wherein the said respective conductors are joined to a single cable leading to the tip end lightning receptor. In a preferred embodiment, a metallic bolt is received in each of the anchor blocks, each metallic bolt extending through the blade shell. In a preferred embodiment, each of the metallic bolts is connected to one or more segmented diverter strips on or in the outer blade surface.

In a preferred embodiment, the first, second, third and/or fourth mesh comprises a copper material. In a preferred embodiment, the first, second, third and/or fourth mesh is a copper mesh. In a preferred embodiment, the first and the second spar cap comprise a plurality of carbon fibre rovings, preferably unidirectional carbon fibre rovings. In a preferred embodiment, one or more of the electrically conductive meshes is seam or spot welded or soldered with tin.

In a preferred embodiment, the first and/or second spar cap is arranged adjacent to a gelcoat or polyurethane coating having a maximal thickness of 0.5 mm.

In a preferred embodiment, the tip end lightning receptor is arranged within a tip end region, the tip end region extending spanwise from the tip end of the blade and comprising up to 10% of the blade length. In a preferred embodiment, the shell material of the blade in its tip end region comprises a carbon material, the tip end region extending spanwise from the tip end of the blade and comprising up to 10% of the blade length.

Preferably, each is mesh is interleaved in between layers of the carbon fibre layers of the spar cap at the tip end and at the root end. In a preferred embodiment, each mesh comprises a plurality of mesh layers which are spread out at the proximal end of the mesh and which are joined together at the distal end of the mesh.

In a preferred embodiment, the blade further comprises a plurality of metallic bolts, preferably metallic bolts comprising tungsten, configured along either, or along both, of the pressure side or the suction side, each of the metallic bolts being electrically connected to the first spar cap or to the second spar cap. Thus, in some embodiments, each of the suction side shell half and the pressure side shell half may comprise a plurality of metallic bolts extending from the outer shell surface through the shell and into the first spar cap or into the second spar cap. For example, each side shell half may comprise 2-10 of such metallic bolts arranged in a spanwise direction. The metallic bolts may advantageously act as lightning receptors on or within the blade surface and/or as equipotential connection to the spar cap. The metallic bolts preferably establish an electrically conductive path to the respective spar cap.

In a preferred embodiment, one or more glass fibre layers are arranged between the first spar cap and the outer surface of the pressure side of the blade, wherein said metallic bolts extend from the outer surface of the pressure side shell half of the blade through said one or more glass fibre layers and into or through the first carbon fibre reinforced spar cap. In another preferred embodiment, one or more glass fibre layers are arranged between the second spar cap and the outer surface of the suction side of the blade, wherein the metallic bolts extend from the outer surface of the suction side of the blade through said one or more glass fibre layers and into the second carbon fibre reinforced spar cap.

In a particularly preferred embodiment, a segmented lightning diverter is arranged on or in the outer blade surface, said segmented lightning diverter being electrically connected to one or more of the metallic bolts. Preferably, a first segmented lightning diverter is connected to the metallic bolts arranged on or within the pressure side shell half and a second segmented lightning diverted is connected to the metallic bolts arranged on or within the pressure side shell half. It is preferred that the metallic bolts are tungsten bolts.

In another aspect, the present invention relates to a lightning protection system for a wind turbine blade including a pressure side and a suction side, and a leading edge and a trailing edge with a chord having a chord length extending therebetween, the wind turbine blade extending in a spanwise direction between a root end and a tip end, the lightning protection system comprising at least one tip end lightning receptor arranged at an outer surface of the blade and a down conductor extending within the blade, a first carbon fibre reinforced spar cap having a tip end and an opposing root end, the first spar cap being arranged inside the blade along the pressure side, a second carbon fibre reinforced spar cap having a tip end and an opposing root end, the second spar cap being arranged inside the blade along the suction side, a first electrically conductive mesh connecting the tip end of the first spar cap to the tip end lightning receptor, a second electrically conductive mesh connecting the root end of the first spar cap to the down conductor, a third electrically conductive mesh connecting the tip end of the second spar cap to the tip end lightning receptor, and a fourth electrically conductive mesh connecting the root end of the second spar cap to the down conductor.

In another aspect, the present invention relates to a method of manufacturing a spar cap assembly for a wind turbine rotor blade, the method comprising the steps of laying a first plurality of carbon fibre rovings, preferably unidirectional carbon fibre rovings, into a mould cavity of a mould to form a first carbon fibre lay-up, the first carbon fibre lay-up having a first end and an opposing second end, arranging a first electrically conductive mesh on the first carbon fibre lay-up at the first end of the first carbon fibre lay-up such that the first electrically conductive mesh extends beyond the first end in a longitudinal direction of the spar cap, arranging a second electrically conductive mesh on the first carbon fibre lay-up at the second end of the first carbon fibre lay-up such that the first electrically conductive mesh extends beyond the second end in a longitudinal direction of the spar cap, laying a second plurality of carbon fibre rovings, preferably unidirectional carbon fibre rovings, on top of the first carbon fibre lay-up and on top of at least part of the first and second electrically conductive meshes, to form a second carbon fibre lay-up, the second carbon fibre lay-up having a first end and an opposing second end, wherein the first and the second electrically conductive meshes extend beyond the first end and beyond the second end of the second carbon fibre lay-up, consolidating the first carbon fibre lay-up, the electrically conductive meshes, and the second carbon fibre lay-up to obtain the spar cap assembly.

This method was found to result in a connection between the spar cap fibre lay-up and the mesh, which results in lesser formation of sparks when current passes through the shear web and the connected meshes. The first end of the spar cap may correspond to the tip end of the spar cap when arranged in the shell of the blade, i.e. the end of the spar cap that is closest to the tip end of the blade. The second end of the spar cap may correspond to the root end of the spar cap when arranged in the shell of the blade, i.e. the end of the spar cap that is closest to the root end of the blade. The longitudinal direction of the spar cap assembly usually substantially corresponds to the spanwise direction of the blade when the spar cap assembly is arranged in the shell half. The mould used in the method may be a spar cap mould. In other embodiments, the mould is a blade mould.

It is preferred that the method comprises additional steps, prior to the consolidating step, of arranging an additional electrically conductive mesh on the second carbon fibre lay-up at the first end of the second carbon fibre lay-up such that the additional electrically conductive mesh extends beyond the first end in a longitudinal direction of the spar cap, and arranging an additional electrically conductive mesh on the second carbon fibre lay-up at the second end of the second carbon fibre lay-up such that the additional electrically conductive mesh extends beyond the second end in a longitudinal direction of the spar cap, followed by laying a third plurality of carbon fibre rovings, preferably unidirectional carbon fibre rovings, on top of the second carbon fibre lay-up and on top of at least part of the additional electrically conductive meshes, to form a third carbon fibre lay-up, the third carbon fibre lay-up having a first end and an opposing second end, wherein the additional electrically conductive meshes extend beyond the first end and beyond the second end of the third carbon fibre lay-up. Similarly, additional layers of carbon fibre rovings, preferably unidirectional carbon fibre rovings, and meshes can be included.

The consolidating step may include infusion of the lay-up by a resin or a binding agent, for example by VARTM. The distal ends of the meshes extending from the fibre lay-up are preferably joined together, for example by seam or spot welding or soldering with tin.

All features and embodiments discussed above with respect to the wind turbine blade likewise apply to the method of manufacturing a spar cap assembly, or to the spar cap assembly as such, or to the lightning protection system, of the present invention, and vice versa.

As used herein, the term "tip end lightning receptor" means a lightning receptor which is arranged within the tip end region of the blade, the tip end region extending spanwise from the tip end of the blade and comprising up to 10% of the blade length.

As used herein, the term "spanwise" is used to describe the orientation of a measurement or element along the blade from its root end to its tip end. In some embodiments, spanwise is the direction along the longitudinal axis and longitudinal extent of the wind turbine blade.

DESCRIPTION OF THE INVENTION

The invention is explained in detail below with reference to an embodiment shown in the drawings, in which.

DETAILED DESCRIPTION OF THE FIGURES

Figure 1:
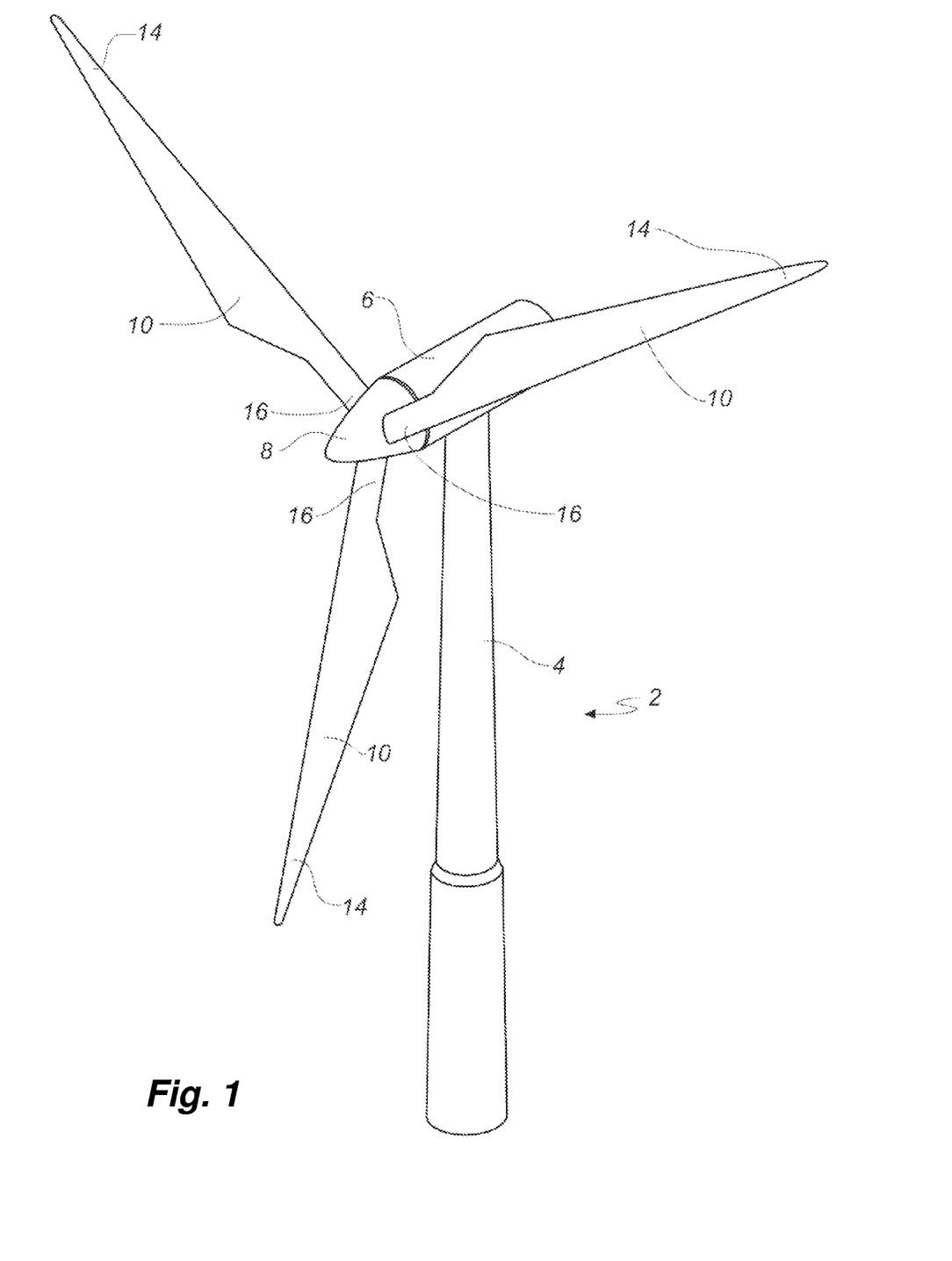
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
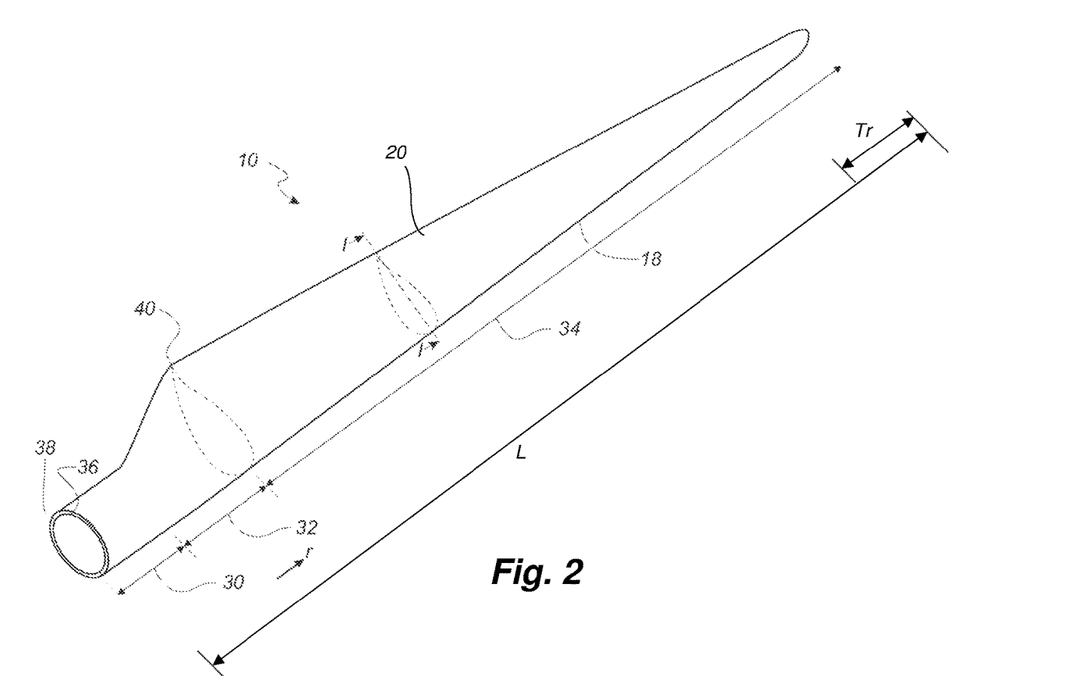
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade, and the tip end region of the blade, the tip end region Tr extending spanwise from the tip end of the blade and comprising 10% of the blade length.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
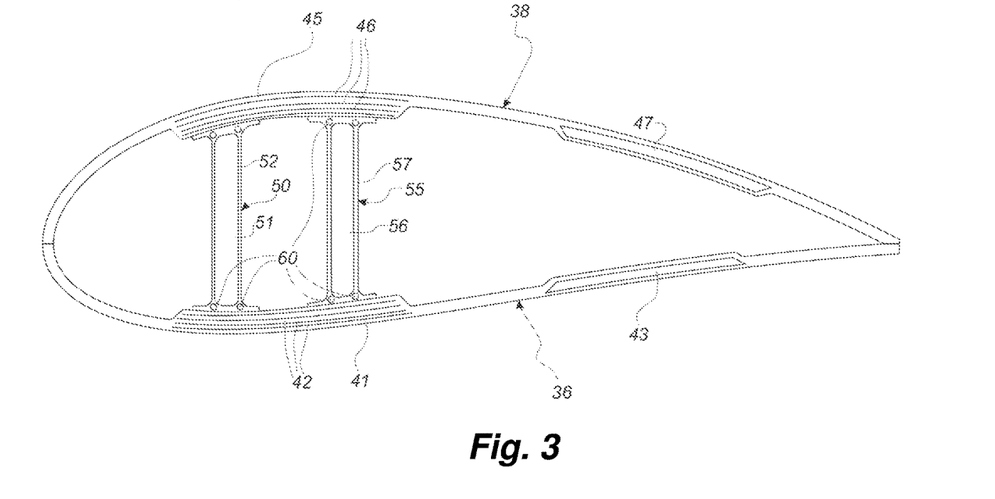
FIG. 3 shows a schematic view of a cross-section of a wind turbine blade.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 36 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

Figures 4, 5, 6:
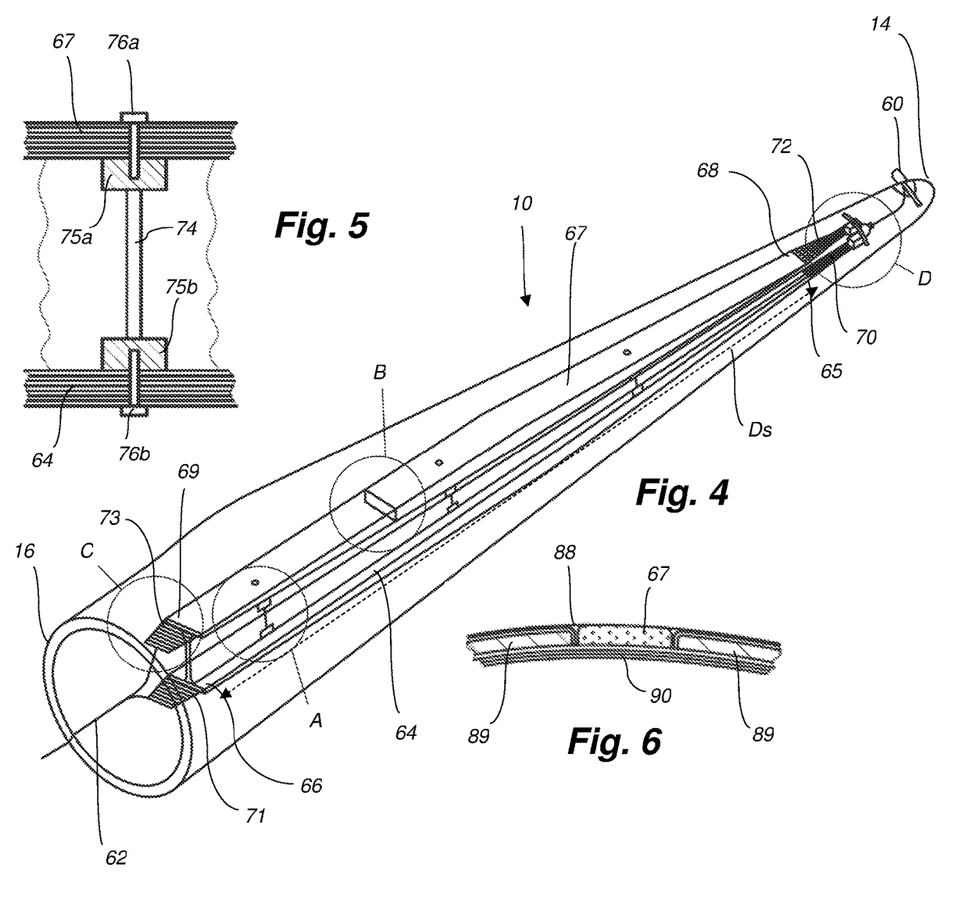
FIG. 4 is schematic perspective view of a wind turbine blade according to the present invention.
FIG. 5 is an enlarged cross sectional view of the encircled region A in FIG. 4.
FIG. 6 is an enlarged cross sectional view of the encircled region B in FIG. 4.

FIG. 4 is schematic perspective view of a wind turbine blade 10 according to the present invention, enabling to view some of the inside components of the blade. The blade 10 comprises a lightning protection system with a tip end lightning receptor 60 arranged at an outer surface of the blade and a down conductor 62 extending within the blade. A first carbon fibre reinforced spar cap 64 having a tip end 66 and an opposing root end 68 is arranged inside the blade along the pressure side. A second carbon fibre reinforced spar cap 67 having a tip end 68 and an opposing root end 69 is arranged inside the blade along the suction side. A first electrically conductive mesh 70 connects the tip end 66 of the first spar cap 64 to the tip end lightning receptor 60, and a second electrically conductive mesh 71 connects the root end 66 of the first spar cap 64 to the down conductor 62. Similarly, a third electrically conductive mesh 72 connects the tip end 68 of the second spar cap 67 to the tip end lightning receptor 60, and a fourth electrically conductive mesh 73 connects the root end 69 of the second spar cap 67 to the down conductor 62.

In the embodiment illustrated in FIG. 4, the first electrically conductive mesh 70 is spaced apart from the second electrically conductive mesh 71 by a spanwise distance Ds of about 75% of the blade length. Similarly, wherein the third electrically conductive mesh 72 is spaced apart from the fourth electrically conductive mesh 73 by a spanwise distance of about 75% of the blade length.

As best seen in the enlarged cross section of FIG. 5, the first spar cap 64 is electrically connected to the second spar cap 67 by conductor 74 to establish equipotential bonding of the spar caps 64, 67. The flapwise extending conductor 74 is fastened by anchor blocks 75a, 75b and metallic bolts 76a, 76b received in the respective anchor block in a threaded connection. In some embodiments, a mesh, such as an electrically conductive mesh, may be implemented into the anchor blocks 75a, 75b for enhancing the conductivity between the two spar caps 64, 67.

Figure 7:
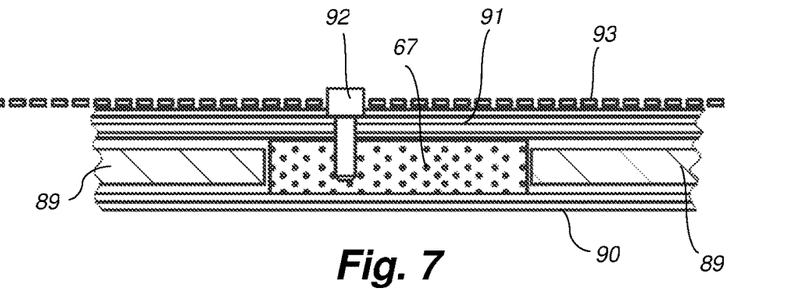
FIG. 7 is a cross sectional view through a blade shell of a blade according to another embodiment of the present invention.

As seen in FIG. 6, the spar cap 67 is arranged adjacent to a gelcoat 88 having a maximal thickness of 0.5 mm. In an alternative embodiment illustrated in FIG. 7, one or more glass fibre layers 91 are arranged between the spar cap 67 and the outer surface of the blade, wherein a lightning receptor bolt 92 extend from the outer surface of the blade through the glass fibre layers 91 and into the spar cap 67. Advantageously, a segmented lightning conductor 93 is arranged on or in the outer blade surface, said segmented lightning conductor being electrically connected the lightning receptor bolt 92 extending through the glass fibre layers 91.

Figure 8:
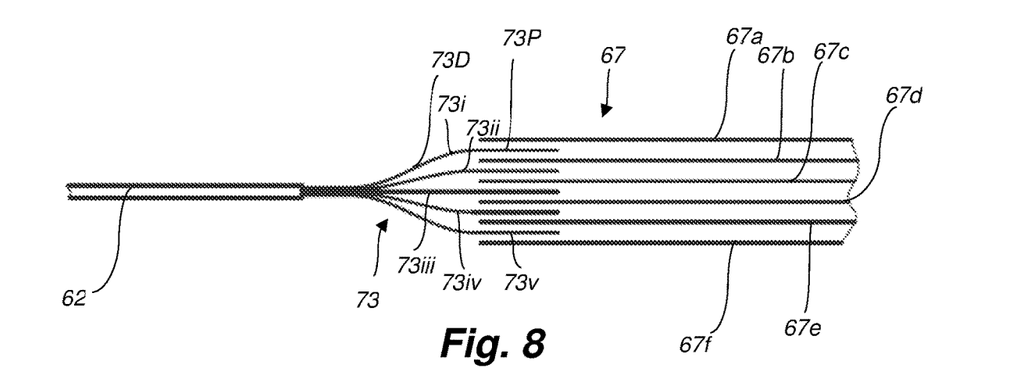
FIG. 8 is an enlarged longitudinal sectional view of the encircled region C in FIG. 4.
Figure 9:
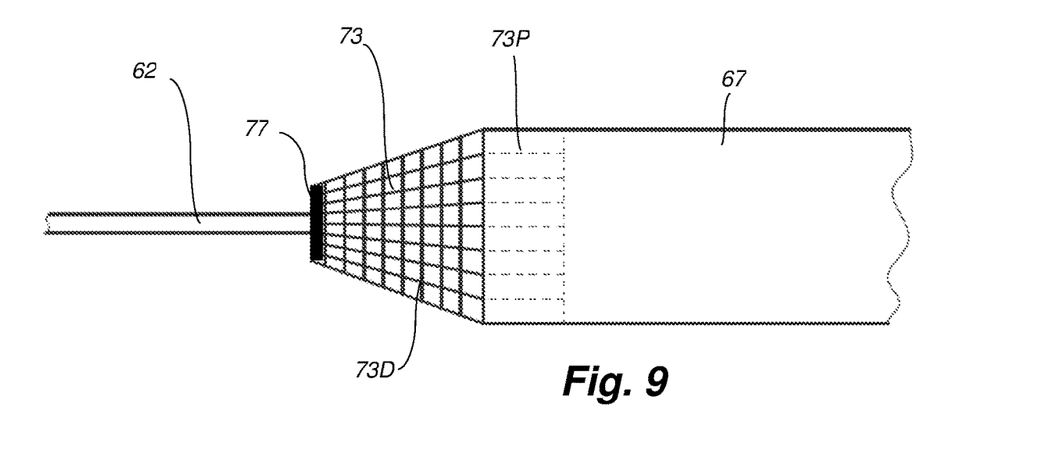
FIG. 9 is an enlarged top view of the encircled region C in FIG. 4.

As best seen in FIGS. 8 and 9, the electrically conductive mesh 73, has a proximal end 73P extending into the spar cap 67 and a distal end 73D protruding the respective spar cap 67. In the illustrated embodiment, the mesh 73 is interleaved in between the carbon fibre layers 67a-f of the spar cap 67. The mesh 73 comprises a plurality of mesh layers 73i-v, which are spread out at the proximal end 73P of the mesh 73 and which are joined together at the distal end 73D of the mesh, for example by seam or spot welding or soldering with tin. FIG. 9 also illustrates that the distal end 73D of the mesh 73 is fastened to a solid metal member 77, the solid metal member 77 being fastened to the down conductor 62.

Figure 10:
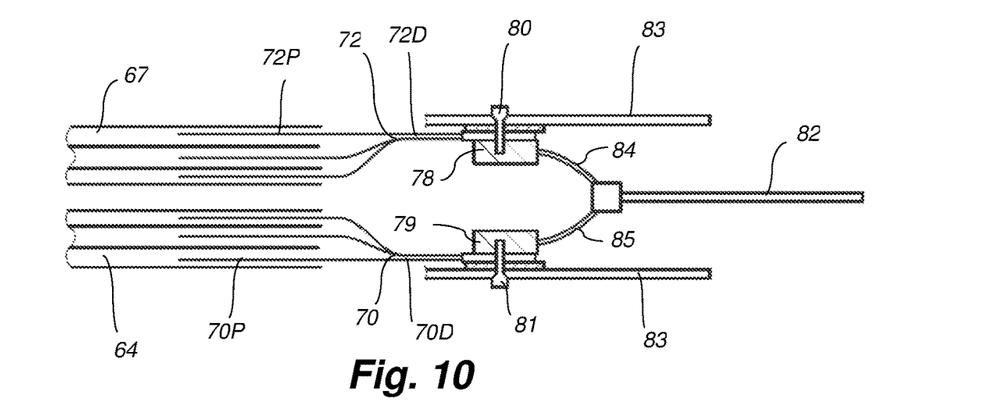
FIG. 10 is an enlarged longitudinal sectional view of the encircled region D in FIG. 4.
Figure 11:
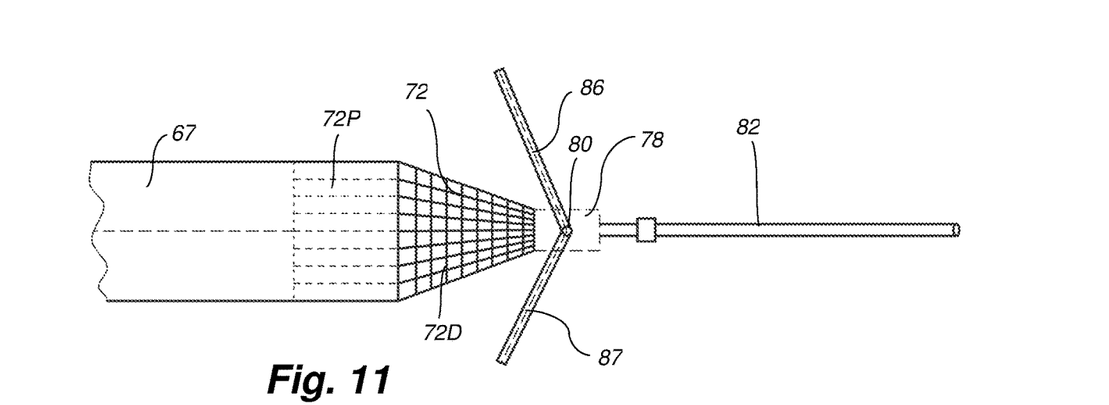
FIG. 11 is an enlarged top view of the encircled region D in FIG. 4.

As best seen in FIG. 10 the respective distal ends 70D, 72D of the first and the third electrically conductive mesh 70, 72 are fastened to a respective anchor block 78, 79, each anchor block 78, 79 being attached to a respective conductor 84, 85, wherein said respective conductors are joined to a single cable 82 leading to the tip end lightning receptor. As seen in FIG. 11, the lightning receptor bolt 80 is connected to two segmented diverter strips 86, 87 on or in the outer blade surface.

Figure 12:
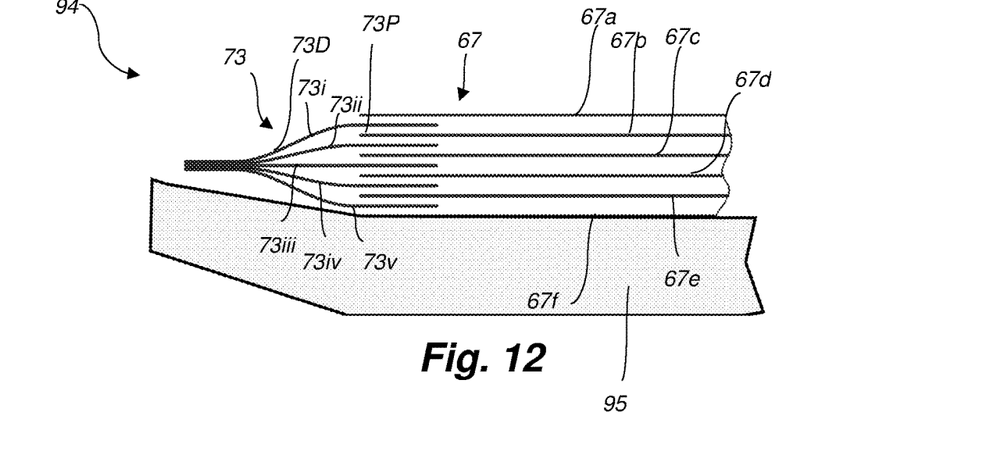
FIG. 12 is a schematic sectional view of a method of manufacturing a spar cap assembly in a mould.

FIG. 12 is a schematic sectional view of a method of manufacturing a spar cap assembly in a mould. The spar cap assembly corresponds to the one illustrated in FIG. 8. The plurality of carbon fibre rovings and the electrically conductive meshes are successively arranged within the mould cavity of the mould 95 to form the spar cap assembly. The distal ends 73D of the meshes extending from the fibre lay-up are joined together, for example by seam or spot welding or soldering with tin.

The invention is not limited to the embodiments described herein and may be modified or adapted without departing from the scope of the present invention.

LIST OF REFERENCE NUMERALS 4 tower
6 nacelle 8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
55 second shear web
51 sandwich core material
52 skin layers
tip end lightning receptor
62 down conductor
64 first carbon fibre reinforced spar cap
65 tip end of first spar cap
66 root end of first spar cap
67 second carbon fibre reinforced spar cap
68 tip end of second spar cap
69 root end of second spar cap
70 first mesh
71 second mesh
72 third mesh
73 fourth mesh
74 conductor
75 anchor block
76 metallic bolt
77 solid metal member
78 anchor block
79 anchor block
80 lightning receptor bolt
81 lightning receptor bolt
82 cable to tip end lightning receptor
83 shell material
84 conductor
85 conductor
86 segmented diverter
87 segmented diverter
88 gel coat
89 sandwich core material
glass fibre shell layers
91 glass fibre shell layers
92 lightning receptor bolt
93 segmented lightning conductor
94 spar cap assembly
mould for spar cap assembly
L length
r distance from hub
R rotor radius

The invention claimed is:

1. A wind turbine blade including a pressure side and a suction side, and a leading edge and a trailing edge with a chord having a chord length extending therebetween, the wind turbine blade extending in a spanwise direction between a root end and a tip end, the blade comprising a lightning protection system comprising at least one tip end lightning receptor arranged at an outer surface of the blade and a down conductor extending within the blade,
a first carbon fibre reinforced spar cap having a tip end and an opposing root end, the first spar cap being arranged inside the blade along the pressure side,
a second carbon fibre reinforced spar cap having a tip end and an opposing root end, the second spar cap being arranged inside the blade along the suction side,
a first electrically conductive mesh connecting the tip end of the first spar cap to the tip end lightning receptor,
a second electrically conductive mesh connecting the root end of the first spar cap to the down conductor,
a third electrically conductive mesh connecting the tip end of the second spar cap to the tip end lightning receptor, and
a fourth electrically conductive mesh connecting the root end of the second spar cap to the down conductor.

2. A wind turbine blade according to claim 1, wherein the first electrically conductive mesh is spaced apart from the second electrically conductive mesh by a spanwise distance of at least 50% of the blade length, and wherein the third electrically conductive mesh is spaced apart from the fourth electrically conductive mesh by a spanwise distance of at least 50% of the blade length.

3. A wind turbine blade according to claim 1, wherein the first spar cap is electrically connected to the second spar cap by at least one conductor.

4. A wind turbine blade according to claim 3, wherein the conductor extends in a substantially flapwise direction.

5. A wind turbine blade according to claim 1, wherein each of the electrically conductive meshes has a proximal end extending into the respective spar cap and a distal end protruding from the respective spar cap.

6. A wind turbine blade according to claim 1, wherein the proximal end of the mesh extends into the respective spar cap by at least 50 mm in the spanwise direction, and wherein the distal end of the mesh protrudes from the respective spar cap by at least 100 mm in the spanwise direction.

7. A wind turbine blade according to claim 1, wherein the respective distal ends of the second and the fourth electrically conductive mesh are fastened to a solid metal member, the solid metal member being fastened to the down conductor.

8. A wind turbine blade according to claim 1, wherein the respective distal ends of the first and the third electrically conductive mesh are fastened to a respective anchor block, each anchor block being attached to a respective conductor, wherein the said respective conductors are joined to a single cable leading to the tip end lightning receptor.

9. A wind turbine blade according to claim 8, wherein a metallic bolt is received in each of the anchor blocks, each metallic bolt extending through the blade shell.

10. A wind turbine blade according to claim 1, wherein the first and the second spar cap comprise a plurality of unidirectional carbon fibre rovings.

11. A wind turbine blade according to claim 1, wherein the first and/or second spar cap is arranged adjacent to a gelcoat or polyurethane coating having a maximal thickness of 0.5 mm.

12. A wind turbine blade according to claim 1, wherein one or more of the electrically conductive meshes is seam or spot welded or soldered with tin.

13. A wind turbine blade according to claim 1, wherein the blade further comprises a plurality of metallic bolts configured along either, or along both, of the pressure side or the suction side, each of the metallic bolts being electrically connected to the first spar cap or to the second spar cap.

14. A wind turbine blade according to claim 1, wherein a segmented lightning conductor is arranged on or in the outer blade surface, said segmented lightning conductor being electrically connected to one or more of the metallic bolts extending through said one or more glass fibre layers.

15. A lightning protection system for a wind turbine blade including a pressure side and a suction side, and a leading edge and a trailing edge with a chord having a chord length extending therebetween, the wind turbine blade extending in a spanwise direction between a root end and a tip end, the lightning protection system comprising
- at least one tip end lightning receptor arranged at an outer surface of the blade and a down conductor extending within the blade,
- a first carbon fibre reinforced spar cap having a tip end and an opposing root end, the first spar cap being arranged inside the blade along the pressure side,
- a second carbon fibre reinforced spar cap having a tip end and an opposing root end, the second spar cap being arranged inside the blade along the suction side,
- a first electrically conductive mesh connecting the tip end of the first spar cap to the tip end lightning receptor,
- a second electrically conductive mesh connecting the root end of the first spar cap to the down conductor,
- a third electrically conductive mesh connecting the tip end of the second spar cap to the tip end lightning receptor, and
- a fourth electrically conductive mesh connecting the root end of the second spar cap to the down conductor.

16. A method of manufacturing a spar cap assembly for a wind turbine rotor blade, the method comprising the steps of
- laying a first plurality of carbon fibre rovings into a mould cavity of a mould to form a first carbon fibre lay-up, the first carbon fibre lay-up having a tip end and an opposing root end,
- arranging a first electrically conductive mesh on the first carbon fibre lay-up at the tip end of the first carbon fibre lay-up such that the first electrically conductive mesh extends beyond the tip end in a spanwise direction,
- arranging a second electrically conductive mesh on the first carbon fibre lay-up at the root end of the first carbon fibre lay-up such that the first electrically conductive mesh extends beyond the root end in a spanwise direction,
- laying a second plurality of carbon fibre rovings on top of the first carbon fibre lay-up and on top of at least part of the first and second electrically conductive meshes, to form a second carbon fibre lay-up, the second carbon fibre lay-up having a tip end and an opposing root end, wherein the first and the second electrically conductive meshes extend beyond the tip end and beyond the root end of the second carbon fibre lay-up,
- consolidating the first carbon fibre lay-up, the electrically conductive meshes, and the second carbon fibre lay-up to obtain the spar cap assembly.

* * * * *